Jan. 13, 1925.
L. G. SECHLER
AGRICULTURAL IMPLEMENT
Filed July 21, 1921
1,522,751
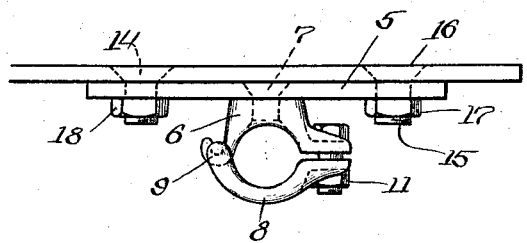
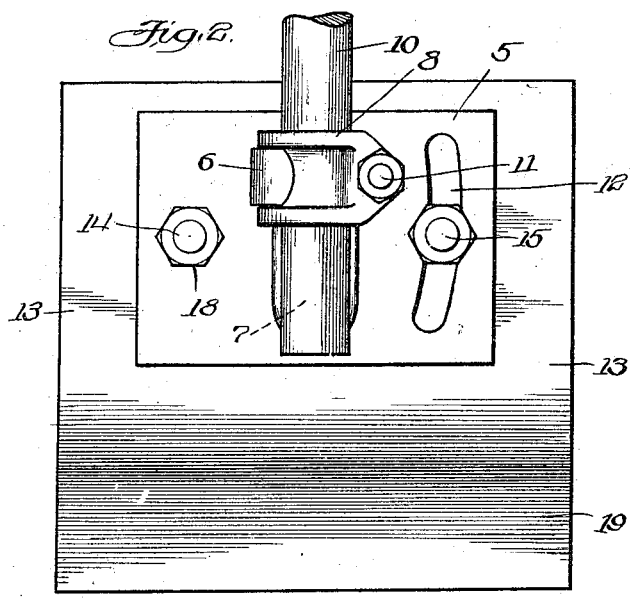
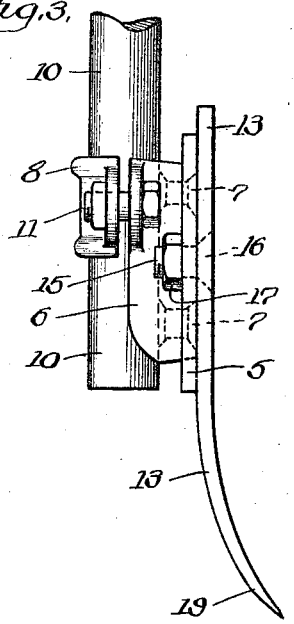
Inventor:
Leslie G. Sechler
By Forée Bain Hinkle
Attys Patented Jan. 13, 1925.

1,522,751

UNITED STATES PATENT OFFICE.

LESLIE G. SECHLER, OF WORTH, ILLINOIS.

AGRICULTURAL IMPLEMENT.

Application filed July 21, 1921. Serial No. 486,324.

*To all whom it may concern:*

Be it known that I, LESLIE G. SECHLER, a citizen of the United States, residing at Worth, in the county of Cook and State of Illinois, have invented certain new and useful Improvements in Agricultural Implements, of which the following is a specification.

This invention relates to improvements in agricultural implements, and especially to cultivator shovels.

One of the objects of the invention is to provide an improved shovel blade for cultivators and means for attaching and adjusting them.

Another object is to provide an improved means for securing the blade to the cultivator structure, whereby its cutting edge may be obliquely adjusted at an angle to its path and by which the cutting edge may be inclined to a greater or less degree from a horizontal plane.

The pointed blades, of the usual cultivator, penetrate too deeply into the soil and thus injure the growing corn by cutting and destroying its roots and they also fail to thoroughly clear up the weeds in the furrows between adjacent rows of corn. In hilling corn it is necessary that the blade of the cultivator shall be made to pass closely to the rows of corn stalks and in so doing the penetration of the pointed blade of usual cultivators extend into the soil to such extent that the finer fibrous roots of the corn are cut away or pulled out and the corn is thus stunted in its growth, or destroyed.

In my present improved shovel the blade is made substantially rectangular in plan outline and located on the shovel with the cutting edge in a substantially horizontal plane, when it is desired to destroy the weeds, in which position it will loosen only the surface soil without entering the soil sufficiently to reach the roots of the corn, but quite enough for the purpose of cultivation, and for destroying the weeds.

To hill the corn the end of the blade near the corn rows is raised and the blade set at an oblique angle to its path with the leading front end lower than the trailing rear end. In this manner there is shallow cultivation with sufficient shift of soil towards the corn rows to make the desired hill and to protect the roots of the growing corn from the tense effect of the sun and without injuring them by the cultivating blade.

In the drawing showing one embodiment of my invention:—

Fig. 1 is a plan view of the shovel blade with its attaching and adjusting device.

Fig. 2 is a rear elevation of the same.

Fig. 3 is a side elevation.

In all the views the same reference characters are employed to indicate similar parts.

The improved cultivator shovel and attaching devices consists of a plate 5 riveted to a clamp member 6, as at 7. Another clamp member 8 is detachably pivoted to the member 6, as at 9, and held to a shank 10 of the shovel by the bolt 11. The structure may be rotatably adjusted upon the shank by loosening the clamp and rotating the blade and its attaching devices to any desired position.

The plate is slotted, as at 12, and is pivoted to the shovel blade 13 by the bolt 14. A bolt 15 passes thru the slot 12, in the plate 5, and is secured in the blade 13 by riveting, as at 16. A nut 17 holds the blade 13 and the plate 5 in adjusted position and the nut 18 clamps the plate and blade together firmly when they are properly adjusted with respect to each other.

The blade 13 is preferably rectangular in outline, as shown more clearly in Fig. 2, and may be curved at 19 when desired, and the shank of the cultivator may occupy a vertical position or it may be inclined, as in the standard cultivator of the character with which my improvements are adapted to be used.

The vertical edges of the blade 13 may be inclined by the device shown, without laterally inclining the shank 10, and the shank 10 may be inclined fore and aft, as in cultivators of the usual character, if inclination in that direction is desired to be given to the blade.

Cultivators of the standard type usually contain a plurality of pointed shovel blades which may be substituted by my rectangular blade, and in the event of such substitution the rectangular blades may be inclined, as described, obliquely or vertically to varying extent. It may be that some of the blades that are in or near the center of the cultivator structure may have their cutting edges placed in horizontal planes, while those on either side are adjustably inclined; in any event the arrangement best adapted for the purpose stated may be accomplished.

Other constructive means may be employed for carrying the invention into effect.

While I have herein shown a single embodiment of my invention for the purpose of clear disclosure it will be manifest, to persons skilled in the art, that changes may be made in the arrangement and configuration of the parts within the scope of the appended claim.

Having described my invention what I claim as new and desire to secure by Letters Patent, is:—

In combination a substantially rectangular shovel blade; a substantially rectangular plate pivoted to the shovel blade at one side of a vertical median plane, said plate having a slot curved on a radius extending from said pivotal point and on the opposite side of said median plane; a stud fixed to the blade and extending thru said slot; a nut on the stud to draw the flat blade and the flat plate together; a clamp member attached to the plate at said median plane said member having a curved part, substantially as long as said plate; and another shorter clamp member overlying the longer clamp member between which to receive and hold a shank whereby to adjust the blade relatively to the shank.

In testimony whereof I hereunto subscribe my name.

LESLIE G. SECHLER.